United States Patent Office 3,262,076
Patented July 19, 1966

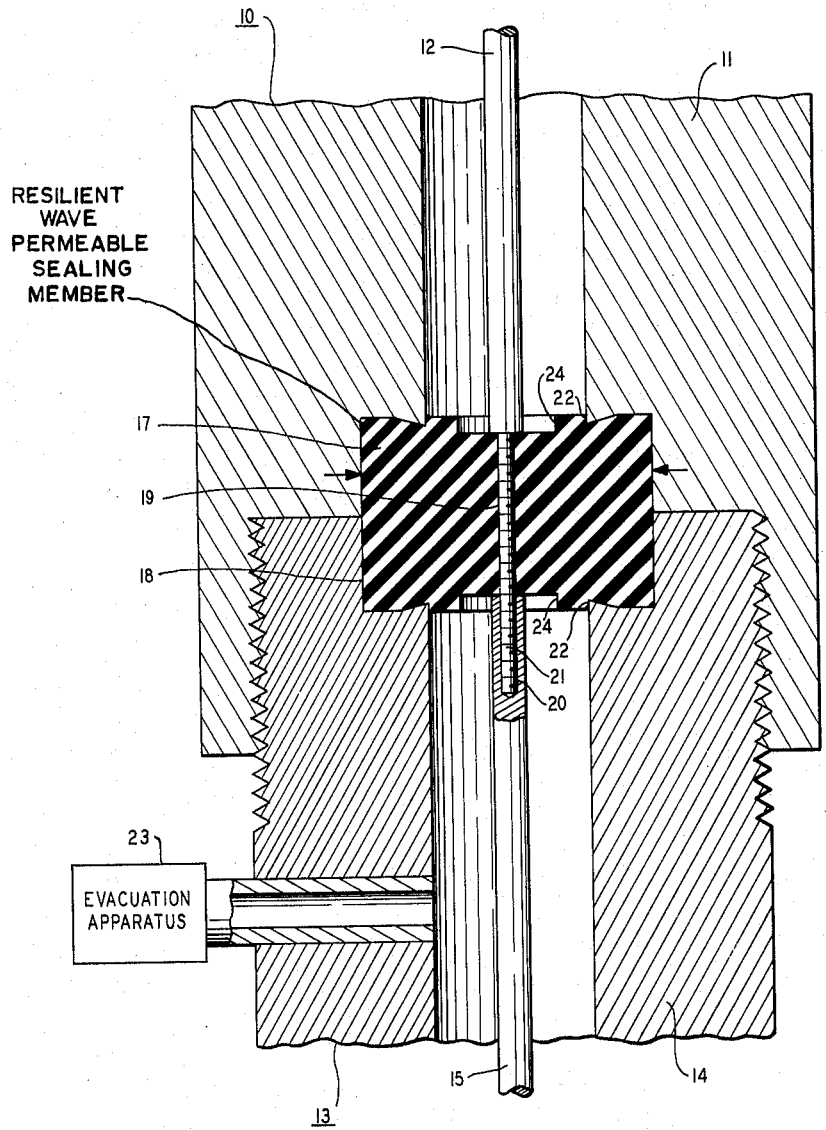

3,262,076
HERMETIC SEAL FOR COAXIAL CABLES WITH RESILIENT WAVE PERMEABLE SEALING MEMBER
Michiyuki Uenohara, Scotch Plains, N.J., assignor to Bell Telephone Laboratories, Incorporated, New York, N.Y., a corporation of New York
Filed Apr. 28, 1964, Ser. No. 363,125
5 Claims. (Cl. 333—96)

This invention relates to hermetic seals for coaxial cables, and more particularly, to electromagnetic-wave permeable hermetic seals which are capable of withstanding thermal and mechanical stresses.

Hermetic or air-tight seals are frequently required in coaxial cables for maintaining vacuums in electronic devices to which the cables are connected. Any such seal must be electromagnetic-wave permeable; that is, it must not unduly reflect or distort electromagnetic wave energy propagating in the cable. Glass is most commonly used for such seals, although ceramic is also sometimes used. Neither of these substances, however, gives consistently dependable hermetic seals when the coaxial cable is subjected to large thermal and mechanical stresses. This characteristic is particularly troublesome when the seals are used for maintaining vacuums in refrigerated electronic devices such as certain types of parametric amplifiers and masers. Moreover, these substances absorb microwave energy to a sufficient degree to degrade the overall performance of very sensitive amplifiers.

An object of this invention is a dependable coaxial cable electromagnetic-wave permeable hermetic seal which is substantially insensitive to thermal and mechanical stresses.

This and other objects of the invention are attained in an illustrative embodiment thereof comprising a sealing member made of a resilient electromagnetic-wave permeable material such as Teflon or polyethylene. The sealing member is contained within a housing defined by recesses in the inner surfaces of the outer conductors of two abutting coaxial cable sections. The inner and outer conductors of the abutting cables are threadedly engaged. The inner conductor of one of the cable sections also extends through a threaded central aperture in the sealing member. The outer diameter of the unstressed sealing member is slightly larger than the diameter of the housing, while the diameter of the central aperture is slightly smaller than the diameter of the treaded central conductor that extends through it. Hence, the resilient sealing member is compressed firmly against both the inner conductor and the outer conductors defining the housing. A knife-edge projection around the periphery of each edge of the housing cuts into the side of the sealing disk to give a firm, sharply-defined seal. I have found that Teflon and polyethylene not only have the mechanical characteristics required for my invention, but they are more permeable to high frequency electromagnetic waves than either glass or ceramic.

These and other objects and features of the invention including a method for assembling the hermetic seal in accordance with the invention, will be more clearly understood from a consideration of the following detailed description taken in conjunction with the accompanying drawing, which is a cross-sectional view of a hermetic coaxial cable seal in accordance with the invention.

Referring now to the drawing, there is shown a coaxial cable section 10 comprising a cylindrical outer conductor 11 surrounding a cylindrical inner conductor 12. Coaxial cable section 10 abuts one end of a coaxial cable section 13 comprising a cylindrical outer conductor 14 surrounding a cylindrical inner conductor 15. The conductors of the coaxial cable sections are preferably of copper.

An air-tight hermetic seal is formed between the two coaxial cable sections by a resilient electromagnetic-wave permeable sealing member 17. The sealing member is contained within a cylindrical housing 18 defined by recesses in the inner surfaces of abutting outer conductors 11 and 14. Sealing member 17 is cylindrical in shape and contains a threaded central aperture 19. Aligned with aperture 19 is a threaded central aperture 20 in inner conductor 15. Extending through apertures 19 and 20 is a threaded male portion 21 of inner conductor 12. Continuous circular knife-edge projections 22 are included on the two peripheries of housing 18 which cut into the resilient sealing member 17. The purpose of sealing member 17 is to prevent the flow of gas from coaxial cable section 10 to coaxial cable section 13, so that section 13 can be effectively evacuated of all air, as for example, by evacuation apparatus 23 which is shown schematically.

Sealing member 17 is made of a material which is air-tight, resilient, and substantially electromagnetic-wave permeable, preferably polytetrafluoroethylene, commonly known as Teflon, or polyethylene. Impedance matching steps 24 are included in the sealing member to compensate for the electrical discontinuity presented by housing 18 and the dielectric constant of sealing member 17. The outer diameter of the sealing member is advantageously slightly larger than the diameter of housing 18, while the diameter of aperture 19 is smaller than the diameter of threaded portion 21. The sealing member 17 is therefore compressed very tightly against the threaded inner conductor portion 21 thereby giving a very tight seal. The knife-edge projections further insure a tight seal between the sealing member and the housing 18.

The following is a preferred method for assembling the over-sized sealing member 17 into the housing 18. The threaded portion 21 of center conductor 12 is threaded into the sealing member 17 while the sealing member is pressed into the recess of the outer conductor 11 as far as is conveniently possible. Outer conductor 11 is then threaded onto outer conductor 14 and the sealing member is pressed into the recess of outer conductor 14 as far as is conveniently possible. The assembly is then refrigerated, as by immersing it in liquid nitrogen. Polyethylene and Teflon have larger coefficients of thermal expansion than copper so that sealing member 17 shrinks to a greater degree from the refrigeration than do the two coaxial cable sections. This permits the assembly to be threaded tightly together as shown in the drawing. However, even after refrigeration, the sealing member has a slightly larger diameter than housing 18, so that the final threading of the coaxial cable sections exerts considerable compressive force on the sealing member as indicated by the arrows. The assembly is then warmed to the ambient temperature and an appropriate sealing glue such as General Electric RTV 102 is applied to the junctions of the inner and outer conductors of the coaxial cable sections with the sealing member 17. With this method of assembly, a cylindrical Teflon sealing member having an outer diameter of .412 inch can be fitted into a housing 18 having a diameter of .410 inch. The maximum diameter of threaded aperture 19 is preferably .115 inch while the maximum diameter of inner conductor portion 21 is .125 inch, with the threads thereof having a pitch of 40 threads per inch.

Teflon and polyethylene are particularly effective as sealing members because they have both the desired qualities of resiliency and electromagnetic-wave permeability. These substances can withstand compressive pressures of over 1000 pounds per square inch without affecting their mechanical structure; yet they absorb less microwave energy than either glass or ceramic. They are particularly effective for maintaining vacuums in refirgerated devices because they can withstand the stresses associated with radical temperature changes. Of even more importance is their ability to be molded into housing 18 and to be compressed with great force against threaded inner conductor portion 19 which insures a dependable seal under all conditions.

Although Teflon and polyethylene sealing members are preferred, it is possible that other substances may be found which present the desired characteristics of resiliency and electromagnetic-wave permeability as required for use in accordance with the present invention. Various other modifications may be made by those skilled in the art without departing from the spirit and scope of the invention.

What is claimed is:

1. In combination:
   a substantially low-loss, low-distortion transmission line for propagating electromagnetic waves comprising first and second metal coaxial cable sections;
   the first coaxial cable section comprising a first outer conductor surrounding a first inner conductor one end of which is threaded;
   the second coaxial cable section comprising a second outer conductor surrounding a second inner conductor;
   one end of the first outer conductor being threadedly engaged with one end of the second outer conductor;
   means for maintaining a substantial vacuum in one cable section while maintaining atmospheric gas pressures in the other cable section comprising a cylindrical, resilient electromagnetic-wave permeable sealing member having a threaded central aperture through which the threaded end of the first inner conductor extends;
   the treaded end of the first conductor being threadedly engaged with the second inner conductor;
   said sealing member being contained within a recessed portion in the inner surfaces of the abutting ends of the first and second outer conductors;
   the unstressed outer diameter of the sealing member being larger than the diameter of the recessed portion, and the unstressed diameter of the central aperture of the sealing member being smaller than the diameter of the threaded end of the first inner conductor, whereby the first and second outer conductors and the first inner conductor exert substantial radial compressive stresses on the sealing member.

2. The combination of claim 1 wherein:
   the sealing member is made of a material having a higher coefficient of thermal expansion than the metal coaxial cable sections, and having been temporarily refrigerated prior to assembly to shrink it, thereby enabling it to be fitted within the recessed portion.

3. The combination of claim 1 wherein the sealing member is made of polyethylene.

4. The combination of claim 1 wherein the sealing member is made of polytetrafluoroethylene.

5. The combination of claim 1 wherein:
   the threaded part of the first outer conductor extends beyond the recessed portion in the inner surface of the first outer conductor an axial distance that is at least approximately as long as the axial length of the sealing member.

References Cited by the Examiner
UNITED STATES PATENTS

| | | | |
|---|---|---|---|
| 3,022,482 | 2/1962 | Waterfield et al. | 174—75 X |
| 3,158,823 | 11/1964 | Bird et al. | 174—22 X |

LARAMIE E. ASKIN, *Primary Examiner.*

ROBERT K. SCHAEFER, *Examiner.*

J. F. RUGGIERO, *Assistant Examiner.*